No. 794,741. PATENTED JULY 18, 1905.
P. PRAY.
TRUCK.
APPLICATION FILED SEPT. 26, 1904.
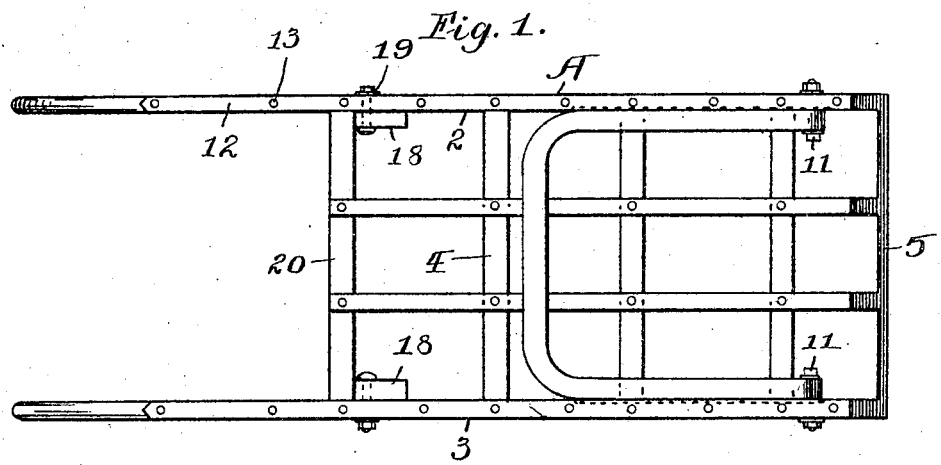
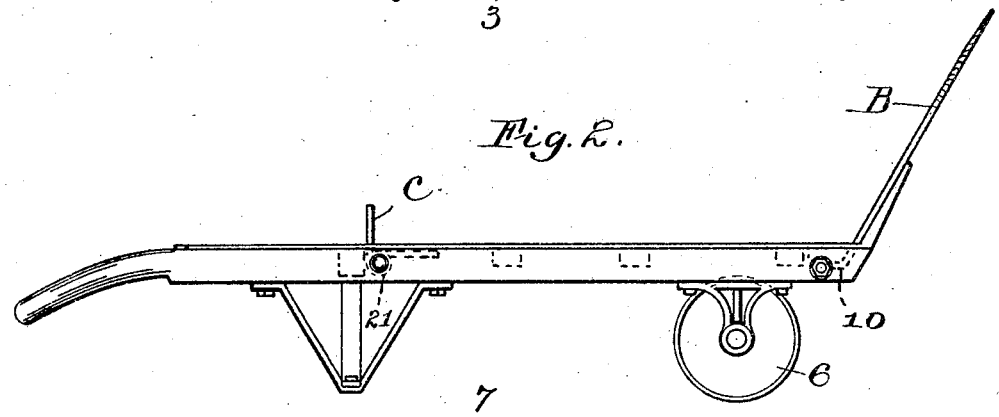
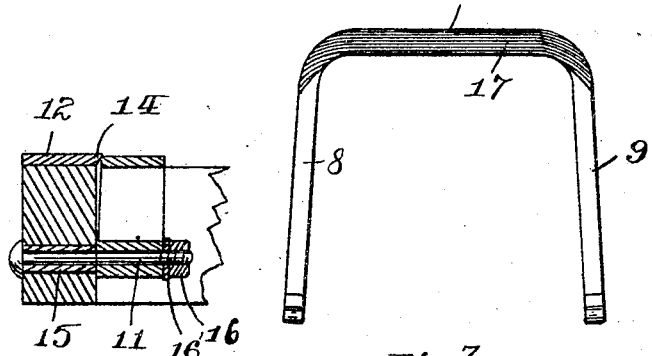
Witnesses:
E. M. Boesel.
Arthur Leland
Inventor:
Pitt Pray,
by Stryker & Bradbury
Attorneys.

No. 794,741. Patented July 18, 1905.

UNITED STATES PATENT OFFICE.

PITT PRAY, OF ST. PAUL, MINNESOTA, ASSIGNOR OF ONE-HALF TO OTIS P. BRIGGS, OF MINNEAPOLIS, MINNESOTA.

TRUCK.

SPECIFICATION forming part of Letters Patent No 794,741, dated July 18, 1905.

Application filed September 26, 1904. Serial No. 225,927.

*To all whom it may concern:*

Be it known that I, PITT PRAY, a citizen of the United States, residing at St. Paul, in the county of Ramsey and State of Minnesota, have invented a new and useful Truck, of which the following is a specification.

My invention relates to improvements in trucks, and has for its object to provide an adjustable extension on the forward end of the truck which is simple in construction and effective in use.

A further object is to provide means coacting with said adjustable extension for holding articles upon the truck when in use.

In the accompanying drawings, forming part of this specification, Figure 1 is a plan view of a truck, showing my invention. Fig. 2 is a side view of Fig. 1, showing the parts in superior position. Fig. 3 is a detail view of the adjustable extension removed from the truck; and Fig. 4 is a detail sectional view of the frame of the truck, showing the journal connection between the extension and the frame of the truck.

In the drawings let A represent a truck which is of ordinary construction provided with side bars 2 and 3, bed-frame 4, nose 5, and wheels 6.

My invention consists in providing an extension B on the forward end of the truck and stops C near the opposite end which coact with said extension, all of said parts being of the following construction: The extension is formed by a single piece of metal or other suitable material, which is bent back between its ends to form an auxiliary nose-piece 7 and spring-arms 8 and 9. The ends of the arms are offset at 10 and journaled, by means of the bolts 11, on the inner faces of the side bars 2 and 3. When attached to the truck, the arms 8 and 9 are sprung into place, their tendency being to press laterally against the sides of said side bars. The surface of the side bars has protecting-strips of metal 12, attached by means of rivets 13. The inner edges of these strips are beveled, as shown in Fig. 4 at 14, and project slightly over the inner edges of said side bars, so that when the extension-frame B is folded down on the bed of the truck the arms 8 and 9 spring over the beveled edges of the strips 12, and thereby lock the extension-frame in folded position. The side bars are provided with metal ferrules 15, through which the bolts 11 pass and are free to turn. These ferrules reduce the wear of the journal parts. The inner ends of the bolts have nuts and washers 16 and 16'. By tightening these ends the extension-frame is retarded in turning, and thus held firmly in superior position. When in folded position, the extension-frame rests flat upon the bed, thus producing substantially an even surface when not in use. When in superior position, it rests upon the nose 5 of the truck. The portion of the frame B between the arms 8 and 9 is beveled at 17, so as to easily slip under a box or other article when it is desired to raise the same upon the truck. The stops C, which coact with the frame B to hold articles upon the truck, consist of a pair of arms 18, each arm being journaled by a bolt 19, passing through the side bars of the truck. The stops are positioned closely adjoining the cross-bar 20, as shown in Fig. 1, and are rounded at 21, so as to turn freely into superior position, as shown in Fig. 2, and rest against the cross-bar 20. When it is not desired to use the stops, they are turned down into the position shown in Fig. 1.

It is obvious that when the parts B and C are turned up they remain in such position when in use until turned down by hand, and when turned down they remain depressed until again lifted into superior position.

Having described my invention, what I claim as new, and desire to protect by Letters Patent, is—

1. A device of the class set forth, consisting, in combination with the bed of a truck, having a nose-piece, of an extension-frame journaled on the forward end of the body of said truck, having a pair of spring-arms, and catch-shoulders on the sides of said truck, between which said arms are adapted to impinge when said frame is turned down on the bed of said truck, for the purposes specified.

2. A device of the class set forth, consisting, in combination with the bed of a truck, having a nose-piece on its forward end, of an extension-frame, having a pair of spring-arms journaled on said bed to frictionally engage said truck when said frame is in superior position and resting against said nose-piece, and catches on said bed, between which said arms are adapted to impinge when said frame is turned down upon said bed, for the purposes specified.

3. A device of the class set forth, consisting, in combination with the bed of a truck, having a nose on its forward end, of an extension-frame adapted to rest against said nose when in superior position and flat upon said bed when depressed, a journal connection between said extension-frame and the bed of said truck, a pair of shoulders, against which said frame is adapted to impinge when in lowered position, and a pair of stops near the opposite end of said truck adapted to coact with said extension-frame, for the purposes specified.

4. A device of the class set forth, consisting, in combination with the bed of a truck, having a nose on its forward end, of an extension-frame having a pair of spring-arms and a beveled face between said arms, surface strips on the bed of said truck, having beveled edges, and a journal connection between the arms of said extension-frame and the bed of said truck, the arms of said frame, when turned down, adapted to engage said beveled edges of said surface strips, for the purposes specified.

5. A device of the class set forth, consisting, in combination with the bed of a truck, having a nose upon its forward end, of side bars, having surface strips 12 attached thereto and provided with beveled edges 14 and a cross-bar 20, an extension-frame, having spring-arms 8 and 9, journal connections between the ends of said arms and said side bars, said arms adapted to engage said beveled edges when the extension-frame is turned down upon the bed of the truck, stops 18 adjoining said cross-bar, and journal connections between said stops and side bars, for the purposes specified.

In testimony whereof I have signed my name to this specification in the presence of two subscribing witnesses.

PITT PRAY.

Witnesses:
  W. H. WILLIAMS,
  F. G. BRADBURY.